(12) United States Patent
Inoue et al.

(10) Patent No.: US 6,354,688 B1
(45) Date of Patent: Mar. 12, 2002

(54) IMAGE PROCESSING METHOD AND APPARATUS AND RECORDING MEDIUM

(75) Inventors: Shizuko Inoue, Inagi; Hiroyuki Miyake, Kawasaki; Makoto Katsuma, Kawaguchi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/296,755

(22) Filed: Apr. 23, 1999

(30) Foreign Application Priority Data

Apr. 27, 1998 (JP) .......................................... 10-116895
Apr. 27, 1998 (JP) .......................................... 10-116896

(51) Int. Cl.$^7$ ................................................. B41J 2/21
(52) U.S. Cl. .......................................... 347/15; 347/43
(58) Field of Search .............................. 347/9, 12, 14, 347/15, 40, 41, 43; 358/500, 502, 503, 504

(56) References Cited

U.S. PATENT DOCUMENTS 5,406,392 A * 4/1995 Aoki et al. .................... 347/43
5,699,090 A * 12/1997 Wade et al. ................... 347/7
5,825,377 A * 10/1998 Gotoh et al. .................. 347/15

FOREIGN PATENT DOCUMENTS

| EP | 0 665 105 | 8/1995 |
| EP | 0 736 388 | 10/1996 |
| EP | 0 750 994 | 1/1997 |

* cited by examiner

Primary Examiner—N. Le
Assistant Examiner—Lamson D. Nguyen
(74) Attorney, Agent, or Firm—Fitzpatrick, Cella, Harper & Scinto

(57) ABSTRACT

An image processing apparatus includes an image forming part for forming images by discharging liquid ink from a plurality of recording elements, a processing unit for processing image data in accordance with processing conditions corresponding to the recording elements, and a preparing unit for inputting read data obtained by reading the images formed by the image forming part and preparing the processing conditions by comparing the read data with standard values preset depending on the kinds of recording agents. An image processing method including the steps of comparing standard values previously set depending on the kinds of recording agents with read data obtained by reading pattern images having a plurality of gradations recorded by an image recording part, and preparing a correction table for each of the recording elements. A recording medium on which a program is recorded so as to be read by a computer, in which standard values previously set depending on the kinds of recording agents are compared with read data obtained by reading pattern images having a plurality of gradations recorded by an image recording part with a plurality of recording elements and the program for preparing a correction table is recorded for each of the recording elements.

8 Claims, 17 Drawing Sheets

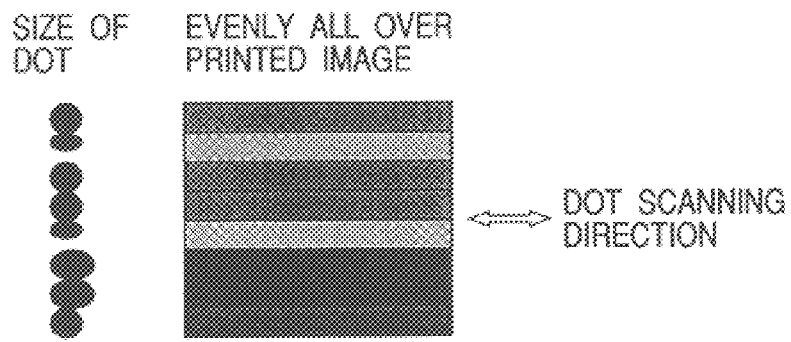
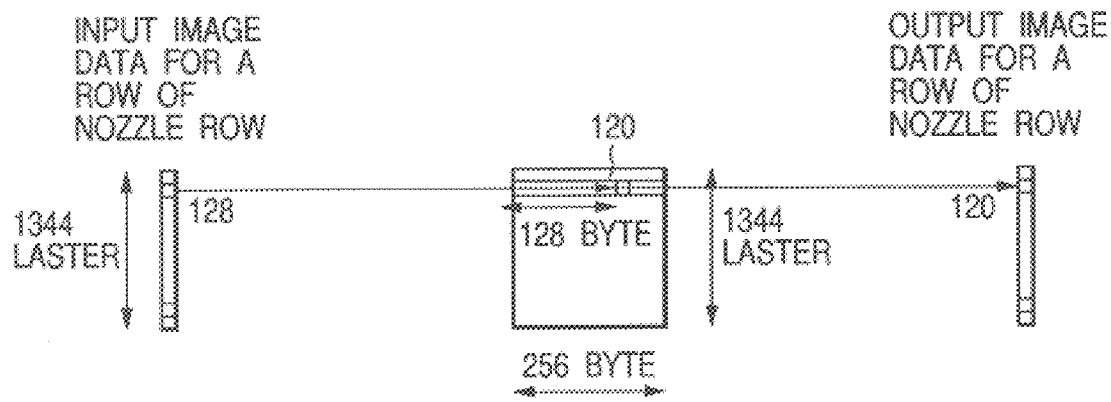

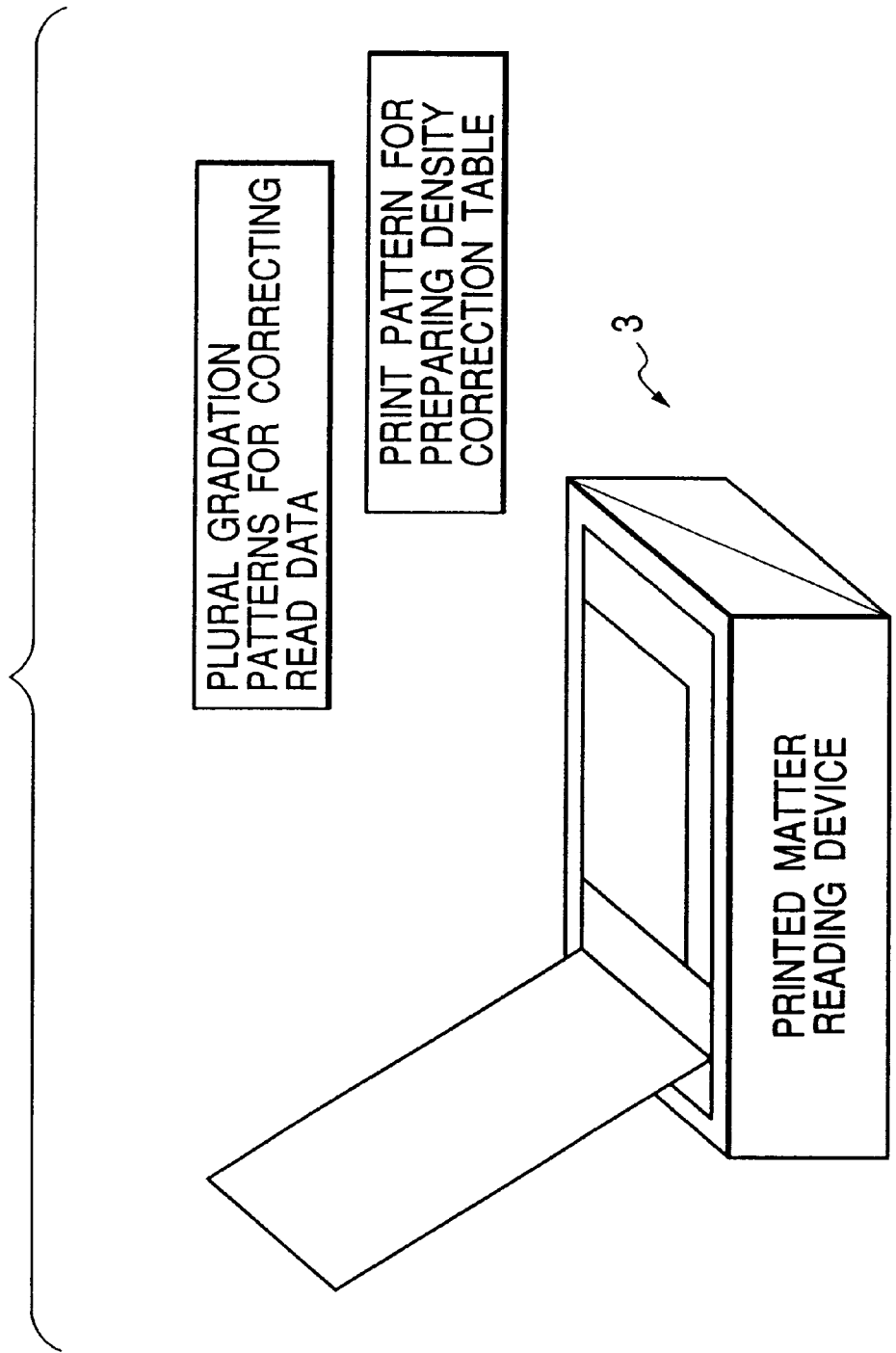

FIG. 20

| GRADATION | DENSITY OD | TARGET VALUE | 8 BITS OUTPUT VALUE | 10 BITS OUTPUT VALUE |
|---|---|---|---|---|
| 1 | 0.2 | 225 | 200 | 800 |
| 2 | 0.4 | 195 | 152 | 608 |
| 3 | 0.6 | 165 | 104 | 416 |
| 4 | 0.8 | 135 | 72 | 288 |
| 5 | 1.0 | 105 | 48 | 192 |
| 6 | 1.2 | 75 | 32 | 128 |
| 7 | 1.4 | 45 | 16 | 64 |
| 8 | 1.6 | 15 | 8 | 32 |

FIG. 21

| GRADATION | TARGET VALUE | ACTUAL VALUE |
|---|---|---|
| 1 | 225 | 227 |
| 2 | 195 | 198 |
| 3 | 165 | 168 |
| 4 | 135 | 137 |
| 5 | 105 | 106 |
| 6 | 75 | 76 |
| 7 | 45 | 47 |
| 8 | 15 | 15 |

B DATA OF IMAGE
DATA L OF YERROW INK

R+G+B DATA OF IMAGE
DATA L OF YERROW INK

IMAGE PROCESSING METHOD AND APPARATUS AND RECORDING MEDIUM

BACKGROUND OF THE INVENTION

1. Field of the Invention

The present invention relates to an image processing method and apparatus for correcting the unevenness of density in an image formed by using a plurality of recording elements, and a recording medium.

2. Related Background Art

An ink-jet printer which has hitherto realized the high quality of printing has a plurality of colors of ink mounted thereon. This ink-jet printer has been designed to achieve its high quality by performing a printing operation using a special color in addition to four basic colors. Further, since an image is configured by dots in the printer of an ink jet type, when dots discharged from some nozzles are smaller than other dots, rasters formed by these nozzles constitute an image thinner than other images. On the contrary, when the dots discharged from the nozzles are larger than other dots, an image which is deeper than other images is formed. Therefore, for instance, when an even density image is printed by a head, the unevenness of density is generated in the main scanning direction of the head. The unevenness of density is corrected by adjusting the number of dots. The ink-jet printer on which a plurality of colors of ink are mounted is designed to print a print pattern for each ink and to read the print pattern by a printed matter reading device in order to correct the unevenness of density in printing and maintain the quality of an image. When the correction amount is calculated from the read image, the full color data of RGB of the read image is converted into gray scale data to detect the unevenness of density. Thus, it is decided whether the read image is thinner or deeper on the basis of a fact that the gray scale data is larger or smaller than a reference. A correction table is prepared in which a correction amount is obtained by multiplying the difference between the reference and actual gray scale data by a certain constant, and the gradation of the print pattern is determined as an input for each color of ink, and the correction amount is added to the gradation as an output. Thus, multi-value image data is converted into multi-value image data and the multi-value image data thus obtained is binarized to adjust the number of dots, and thereby the unevenness of density is corrected.

However, in the above mentioned conventional example, in case of a color which reacts only to a B filter, for example, yellow ink or the like, if the full color data of RGB is converted into gray scale data, it may be possibly converted into generally small data and the quantization thereof may become undesirably rough. Consequently, the steps of available correction amount may be also roughened so that the fine adjustment of the correction of density cannot be done. Furthermore, when orange or the like was employed as a special color other than four basic colors, the correction of density could not be properly carried out.

Besides, in the conventional printer of an ink-jet type, nozzles have been provided for actually discharging ink and a head which has been most heavily consumed has been separated from a device so that it can be replaced by another one, and therefore, maintenance has been easy to lengthen the life of the device.

In the above mentioned conventional example, however, there has been generated the unevenness in the diameter of dot of ink discharged depending on heads, hence density difference has been disadvantageously generated depending on the heads. More specifically, when the head is replaced by a new head, there is a difference in density between an image printed by the former and an image printed by the latter. Therefore, it has been impossible to print the same printed matter regardless of printing by using the same image data.

SUMMARY OF THE INVENTION

The present invention was devised by considering the above described problems and accordingly, it is an object of the present invention to prevent the density difference between formed images which is generated due to the change of a recording part or the difference in the solid of the recording part by forming processing conditions using a standard value corresponding to the kind of a recording agent.

That is to say, it is an object of the present invention to record an image conscientiously devoted to an inputted image.

In order to attain the above described object, according to a preferred embodiment of the present invention, there is provided an image processing apparatus comprising: an image forming part for forming an image by discharging liquid ink from a plurality of recording elements; a processing unit for processing image data in accordance with a processing condition corresponding to the recording elements; and a generating unit for inputting read data obtained by reading the images formed by the image forming part and generating the processing conditions by comparing the read data with a standard value preset depending on the kind of recording agents.

It is another object of the present invention to form highly accurate correction data by preparing processing conditions with the characteristic of an image reading part used upon preparation of the processing conditions taken into consideration.

In order to attain the above described object, according to a preferred embodiment of the present invention, there is provided an image processing apparatus comprising: an image reading part for reading images to produce image data; an image forming part for forming an image by discharging liquid ink from a plurality of recording elements; a processing unit for processing input image data in accordance with processing conditions suitable for the recording elements; a preparing unit for comparing read data obtained by reading a reference pattern using the image reading part with reference data indicating the reference pattern to create the correction data of the image reading part; and a forming unit for correcting read data obtained by reading the images formed by the image forming part using the correction data of the image reading part and comparing the corrected data with standard values previously set in accordance with the kinds of recording agents so as to form the processing conditions.

It is still another object of the present invention to form highly accurate correction data by preparing the correction data using a standard value corresponding to the kind of a recording agent for printing a pattern. For attaining the above described object, there is provided an image processing method for reading patterns printed by the use of a plurality of recording agents by a reading part and creating correction data corresponding to each of the recording agents, the method comprising the step of producing the correction data using color components relevant to the kinds of the recording agents with which the patterns are printed among a plurality of color components produced in the reading part.

Still other objects of the present invention, and the advantages thereof, will become fully apparent from the following detailed description of the embodiments.

BRIEF DESCRIPTION OF THE DRAWINGS

FIG. 2 is an explanatory view showing the unevenness of density of a formed image;

FIG. 4 is an explanatory view showing a correction table storing area;

FIG. 18 is an explanatory view for explaining processes for reading patterns upon process for preparing a density correction table;

FIG. 20 is an explanatory view showing a reference gradation pattern;

FIG. 21 shows an example of actual read data;

DESCRIPTION OF THE PREFERRED EMBODIMENTS

First Embodiment

Figure 1:
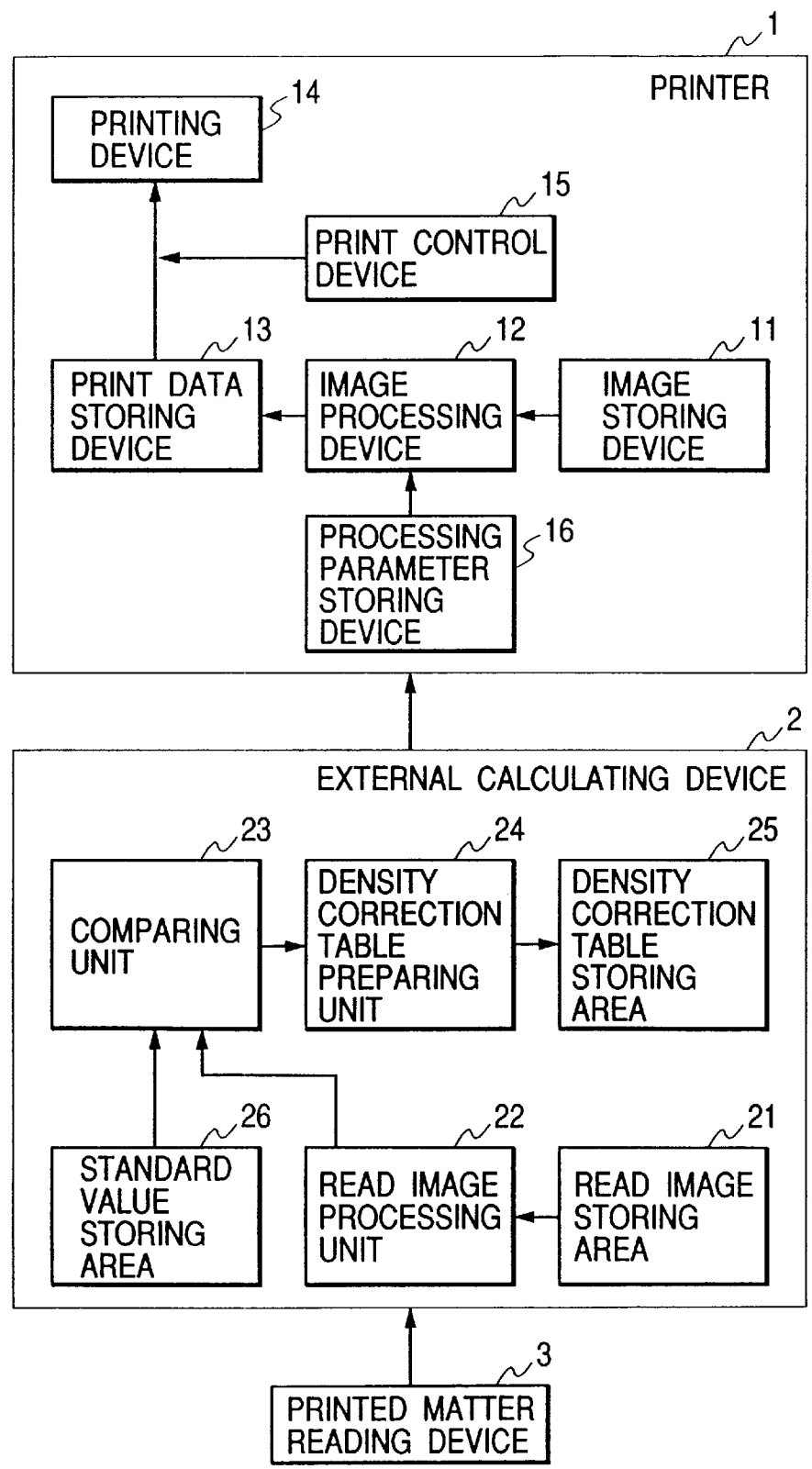
FIG. 1 is a system configuration diagram showing a first embodiment of the present invention.

Referring to FIG. 1, the system configuration diagram of an image processing apparatus according to the present invention is illustrated. The image processing apparatus comprises a printer 1, an external calculating device 2 and a printed matter reading device 3 for reading a print pattern printed by the printer 1.

The printer 1 comprises an image storing device 11 for storing transferred multi-value image data, an image processing device 12 for converting the stored multi-value image data into actual print data, a print data storing device 13 for temporarily storing the print data produced by the image processing device 12 and a printing device 14 for printing the print data by a print control device 15 for controlling the print. Further, the image processing device 12 performs processes by parameters stored in a processing parameter storing device 16.

The external calculating device 2 comprises a read image storing area 21 for temporarily storing the image read by the printed matter reading device, and a comparing unit 23 for comparing data obtained by processing the read image by a read image processing unit 22 with a standard value stored in a standard value storing area 26, and a density correction table storing area 25 for storing a density correction table formed by a density correction table preparing unit 24 as a result of comparison.

The printer 1 includes ink of special four colors in addition to ink of four basic colors C (Cyan), M (Magenta), Y (Yellow) and K (Black) so that it forms an image with eight colors in all. When reactive ink is employed, the special colors include, for instance, light C, light M, blue, and orange. When dispersive ink is employed, the special colors include, for instance, light C, light M, blue and violet.

A printing is carried out by two heads arranged in front and rear positions in a cloth feeding direction for each color. The head located in the front position is called a Front head (F head, hereinafter) and the head located in the rear position is called a Rear head (R head, hereinafter). A head used for the printer 1 is a B812N head which has 1408 nozzles and 1360 nozzles located at the center are nozzles effective for printing. 1344 nozzles located in the middle thereof carry out a printing. Eight nozzles respectively in upper and lower parts are used for adjusting a longitudinal register. Accordingly, one band is composed of 1344 rasters.

Each head can be changed to or replaced by a new one. For instance, the head can be changed to a new head so as to meet ink suitable for the purpose of its use.

Now, referring to FIG. 3, processes in which the multi-value image data transferred to the printer 1 from the external calculating device 2 is printed by the printing device will be described below.

(1) The multi-value image data transferred from a host computer is stored in the image storing device from which the data is read for each band.

In the processing parameter storing device are stored a pallet table, gamma tables, density correction tables, longitudinal register adjusting values and horizontal register adjusting values. Such processes as described below will be carried out in the image processing device.

(2) The multi-value image data is separated into multi-value data for each color of ink on the basis of a pallet conversion.

(3) A gamma conversion is carried out for each color of ink on the basis on a gamma conversion.

(4) The density of the heads is corrected on the basis of the density correction tables.

(5) The multi-value data is binarized on the basis of the diffusion of error so that the multi-value data is converted into binary data.

The processes (2) to (5) are roughly disclosed in U.S. patent application Ser. No. 09/407,372, entitled <<Image Processing Apparatus and Method of Manufacturing Inkjet Recorded Article>> filed on Mar. 20, 1995.

(6) An SMS (sequential multiscan system) serves to decide which of the F head and the R head prints the binary data of each color. When turning an attention to a certain raster, dots are assigned alternately to the F head and the R head from a dot which first appears on the left end of an image so that they are alternately printed by the F head and the R head. Thus, the successive dots are not printed by the same head, hence a printing operation can be carried out at speed twice as high as the driving frequency of the head. In practice, the dot which first appears from the left end of the image of each raster is printed by the R head, in the case of an odd raster. On the other hand, in case of an even raster, the dot is printed by the F head. At this time, one image data constitutes binary data for each head.

(7) A TMC base (Timing Memory Controller) serves to output for each head the data of one band (a band indicates a unit of width in the direction of a row of nozzles which is printed when the head scans a row once) one row by one row in the direction of the nozzle row. The dislocation in the main scanning direction of the head is adjusted on the basis of horizontal register adjusting values. Depending on the horizontal register adjusting values, the output timing of the data of one row is respectively different.

(8) A PHC (a connector base between the printer heads) serves to output the binary data in the direction of a nozzle row so as to correspond to nozzles which actually perform printing operations. The dislocation in the direction of a nozzle row of the head is adjusted by longitudinal register adjusting values. Since the B812N head has 1344 nozzles (recording elements) and eight nozzles respectively in the upper and lower parts which are all effectively used for printing, the longitudinal register adjusting values are located within a range of −8 to +8. When the longitudinal register adjusting values are located in a range of ±0, the central 1344th nozzle is employed. However, when the longitudinal register adjusting values are located within a range of ±1 to 8, the 1344th nozzle which actually performs a printing operation is shifted by 1 to 8 nozzles from the central position, thus, the data of 1344 nozzles are outputted so as to correspond to nozzles which actually carry out printing operations on the basis of the longitudinal register adjusting values.

(9) Print data is temporarily stored in the print data storing device.

(10) Finally, the print data of each nozzle is converted into head driving data by the print control device and ink is discharged by the printing device to print the data.

Figure 5:
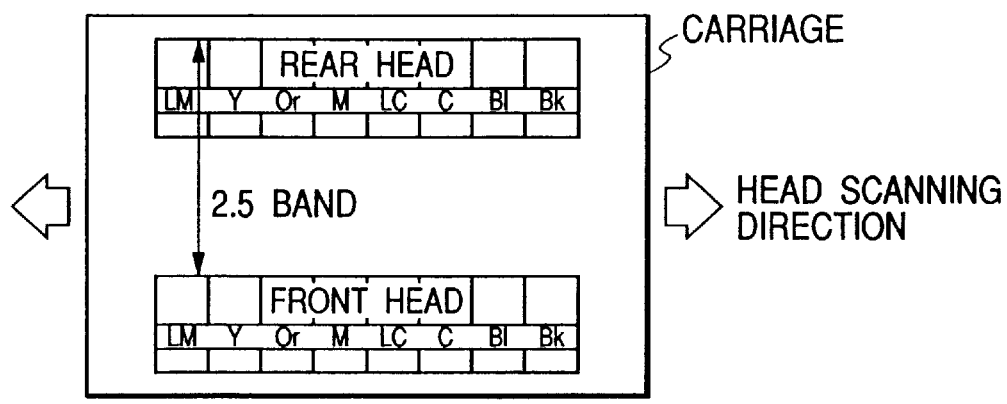
FIG. 5 is an explanatory view showing the arrangement relation between an F head and an R head.
Figure 6:
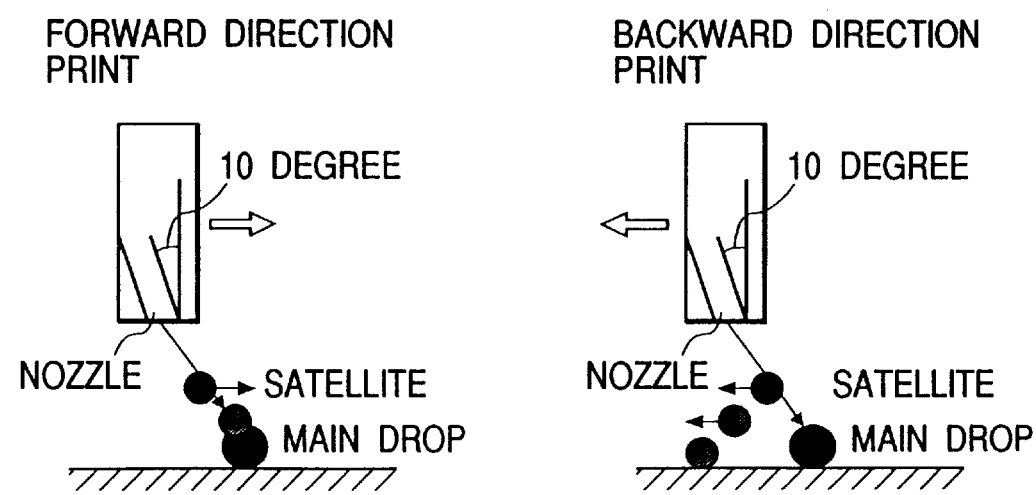
FIG. 6 is an explanatory view showing the relation between a head and a recording medium.

The total of 16 heads are arranged in such a manner that two heads for each color are disposed in a carriage with the distance of 2.5 bands therebetween in a cloth feeding direction, as shown in FIG. 5. Further, the head is not vertical to the face of a nozzle and is inclined by 10 degrees relative thereto, as illustrated in FIG. 6. Therefore, in the printing when the carriage moves in a forward direction, a satellite does not attract attention, however, it is striking in the printing when the carriage moves in a backward direction. There is generated a difference in dot diameter between a dot in the forward direction printing and a dot in the backward direction even when these dots are discharged from the same nozzle. Generally, the backward direction print is deeper than the forward direction print.

Figure 7:
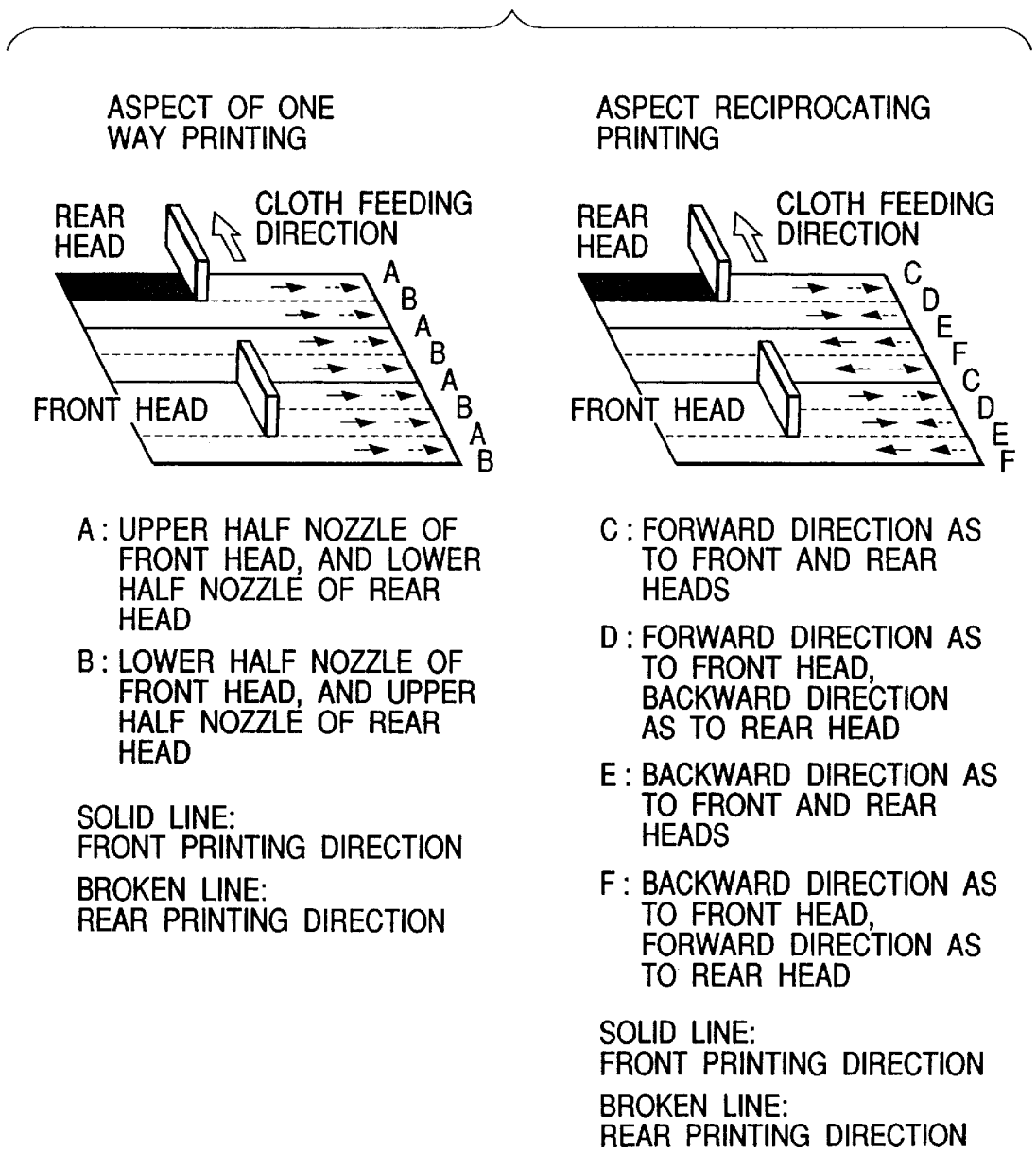
FIG. 7 is an explanatory view showing the unevenness of density of a formed image.

With the above description taken into consideration, while the unevenness of density is generated at intervals of one band cycles at the time of a one-way printing in which a printing is carried out only when the carriage moves in the forward direction, the unevenness of density is also generated at intervals of two band cycles at the time of a reciprocating printing in which the printing is carried out when the carriage moves not only in the forward direction but also in the backward direction, as illustrated in FIG. 7. Therefore, the printer 1 is provided with an area for the correction table of the unevenness of density of two bands so that the unevenness of density can be corrected. As shown in FIG. 4, two areas for storing correction tables may be provided so that only one correction table is employed at the time of the one-way printing. The correction table to be used is switched to another table depending on an odd band or an even band at the time of the reciprocating printing.

Now, processes for actually preparing density correction tables will be described below.

For deciding whether a watched raster is thinner or deeper than a reference, correction tables and gamma tables print the density correcting patterns of respective colors both in their linear states. The density correcting print pattern is composed of a plurality of gradations. Further, for the purpose of preparing the correction table at the time of the reciprocating printing, the density correcting print pattern is configured by rasters of two bands or more. If the correcting print pattern is exactly configured by two band rasters, a boundary part will become whity due to the reflected light of white color of a printing sheet when they are read by the reading device. About 44 rasters respectively in the upper and lower parts may be preferably added to the rasters of two bands.

Figure 8:
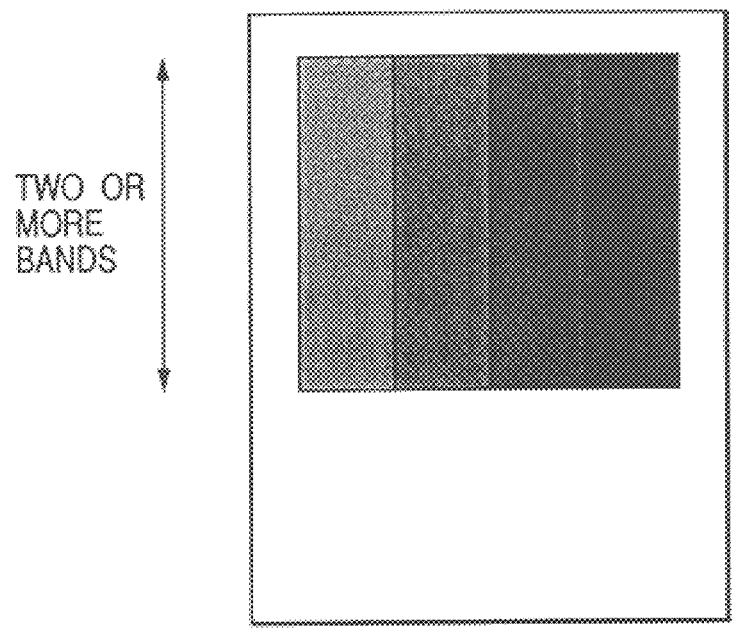
FIG. 8 shows an example of density correcting patterns.

An explanation will be now given to a procedure for preparing a density correction table for K by using, for instance, a density correcting print pattern configured by four gradations as shown in FIG. 8. It is assumed that the four gradations are image data 64, 128, 192 and 255.

Initially, this print pattern is read by the printed matter reading device. One pixel of the print pattern can be coordinated with one pixel of a read image by having resolution equal to the print pattern. The read image of full color of RGB is stored in the read image storing area 21 of the external calculating device 2. The read image processing unit 22 generates the scan data of each raster in accordance with a procedure mentioned below.

(1) Only one of the most sensitive data of R, G and B is selected. The selected data is unconditionally determined depending on the kind of ink and the color of ink. For example, while reactive ink uses two light colors (light C and light M) and two special colors (Blue and Orange) as well as the four basic colors CMYK, the selected data is determined as shown in Table 1. While dispersive ink employs two light colors (light C and light M) and two special colors (Blue and Violet) as well as the four basic colors CMYK, the selected data is determined as shown in Table 2.

TABLE 1

| Reactive ink | Black | Blue | Cyan | Light Cyan | Magenta | Orange | Yellow | Light Magenta |
|---|---|---|---|---|---|---|---|---|
| Selected data | G | R | R | R | G | B | B | G |

TABLE 2

| Dispersive ink | Black | Blue | Cyan | Light Cyan | Magenta | Violet | Yellow | Light Magenta |
|---|---|---|---|---|---|---|---|---|
| Selected data | G | R | R | R | G | G | B | G |

(2) Then, the density of the gradation part of printed image data L is measured. The average value of 256 pixels is calculated in the printing direction in the gradation part.

Figure 9:
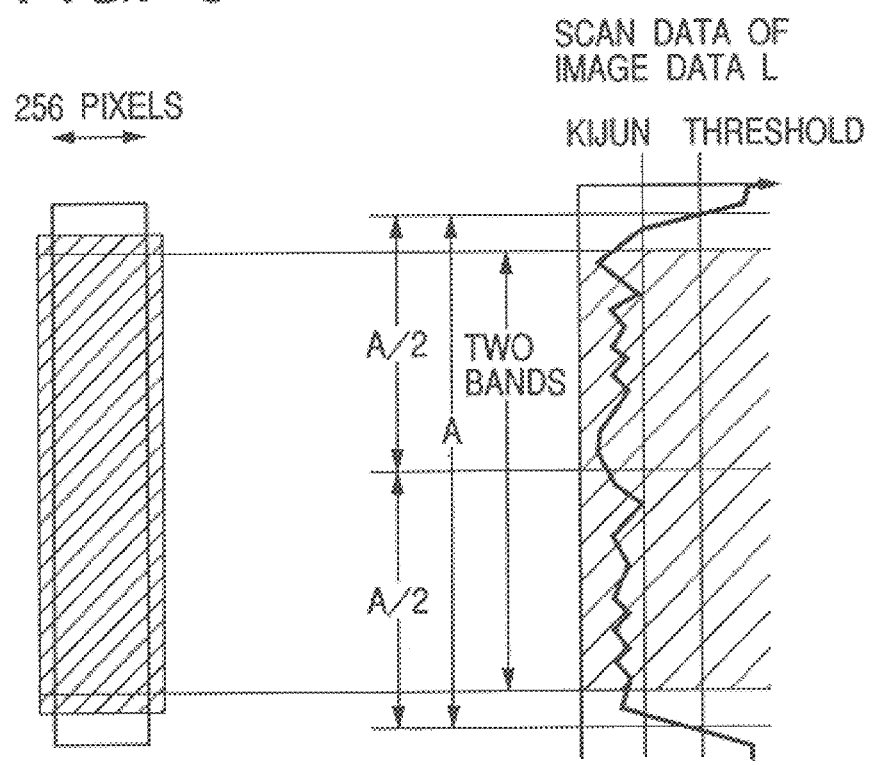
FIG. 9 shows an example of the read data of the density correcting pattern.

(3) When such scan data as shown in FIG. 9 is gotten, a range A including values not larger than a threshold is obtained.

(4) The data of two bands is determined as the scan data of each raster from the center of the range A.

(5) At the time of the one way printing, the correction table of one band may be obtained. Since the data of the two bands has been already gotten, more average scan data of one band can be obtained by averaging the data of the two bands.

In the standard value storing area 26 are stored standard values of image data having a plurality of gradations which configures print patterns respectively for the kinds of ink and for the colors of ink. The comparing unit 23 reads the standard values of the reactive ink and K ink in the image data L from the standard value storing area 26 and compares the standard values with the scan data of each raster. If they are equal to each other, a correction amount is determined to be 0. If they are not equal to each other, the correction amount $\Delta L(n)$ will be calculated on the basis of a Equation. 1'. $\Delta L(n)$ indicates a correction amount relative to the image data L of a n-th raster, KIJUN indicates a standard value and D(n) is the scan data of the n-th raster.

$$\Delta L(n) = a*(KIJUN - D(n)) \quad 0 \leq D(n) \leq 255 \quad \text{(Equation 1')}$$

KIJUN is a fixed value determined unconditionally by the kind of ink, the color of ink and image data Lm.

a is a negative constant determined by the kind and the color of ink.

Figure 10:
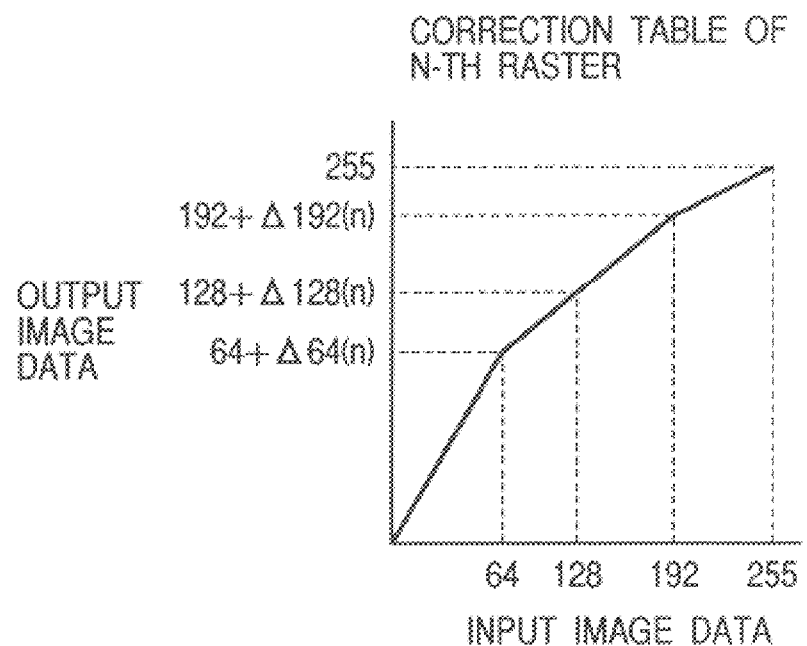
FIG. 10 shows an example of density correction tables.

The scan data is luminance data. Therefore, when the scan data of the n-th raster is larger than the standard value, it is decided that this raster is thin and the correction amount becomes positive. On the contrary, when the scan data of the n-th raster is smaller than the standard value, it is decided that this raster is deep and the correction amount becomes negative. The above mentioned procedure is carried out for all the gradations so that the correction table of the n-th raster is prepared as illustrated in FIG. 10.

Then, the density correction table of each raster (that is to say, the density correction table for each nozzle) is formed by the density correction table preparing unit 24. As illustrated in FIG. 10, the density correction table for K is prepared for outputting the correction amount $\Delta L$ added to the image data L.

The above processes for preparing the density correction table are performed for each ink so that the density correction table is formed.

AS mentioned above, in the present embodiment, the standard values are determined by the kinds of ink and the colors of ink, hence the generation of a density difference due to the replacement of a head and the difference between printers can be desirably solved. Further, since the density correction tables are provided respectively for the two bands of rasters, the images can be formed with such dots as shown in FIG. 2 and the unevenness in lines generated because of the irregularity of diameter in dots can be corrected to absolute density.

It should be noted that the standard values stored so as to meet the kinds of ink and the colors of ink may be arbitrarily set by a user. The standard values can be arbitrarily set, hence a density correction table can be also prepared, for instance, for a new kind of ink.

Second Embodiment

Figure 11:
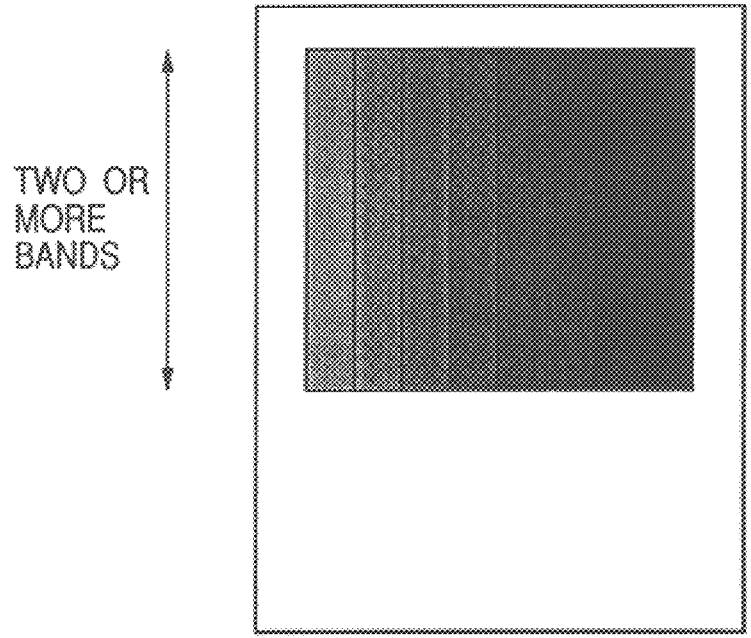
FIG. 11 shows an example of density correcting patterns.

In order to decide whether the watched raster is thinner or deeper than a reference which has been done in the first embodiment, it is assumed that the prints of the density correcting patterns of each color in the linear states of both the correction tables and the gamma tables are formed in patterns configured by, for instance, eight gradations (image data 15, 31, 63, 95, 127, 159, 201 and 255) as shown in FIG. 11. Processes for preparing a density correction table for K will be described below.

Initially, the print pattern is read by the printed matter reading device. One pixel of the print pattern can be coordinated with one pixel of a read image by having resolution equal to the print pattern.

The read image of full color of RGB is stored in the read image storing area 21 of the external calculating device 2. The read image processing unit 22 generates the scan data of each raster in accordance with a procedure mentioned below.

(1) Only one of the most sensitive data of R, G and B is selected.

(2) Then, the density of the gradation part of printed image data L is measured. The average value of 256 pixels is calculated in the printing direction in the gradation part.

(3) When such scan data as shown in FIG. 9 is gotten, a range A including values not larger than a threshold is obtained.

(4) The data of two bands is determined as the scan data of each raster from the center of the range A.

(5) At time of the one way printing, the correction table of one band may be obtained. Since the data of the two bands has been already got, more average scan data of one band can be obtained by averaging the data of the two bands.

Figure 12:
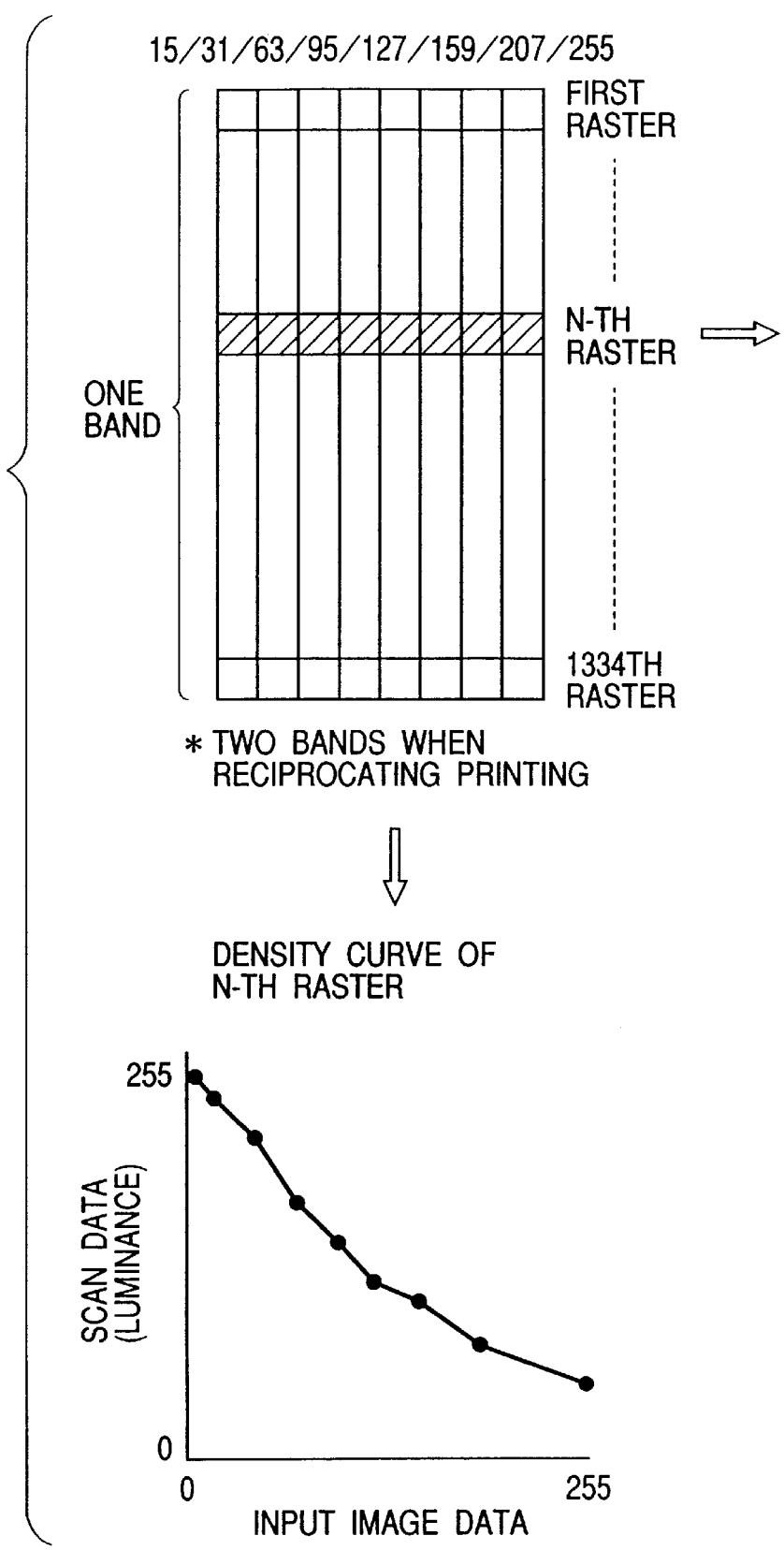
FIG. 12 shows an example of density curves.

After the scan data of the eight gradations of each raster are calculated, a density curve (actual) is formed for each raster. Scan data 255 (assuming that it is completely white) at the time of image data of 0 is added to the actually acquired eight scan data so that the linear interpolation of nine data is carried out and the scan data of the image data from 0 to 255 are calculated. This curve will be referred to as a density curve (see FIG. 12), hereinafter.

In the standard value storing area 26 are stored standard values of image data having a plurality of gradations which constitute print patterns respectively for the kinds of ink and for the colors of ink. The comparing unit 23 reads the standard values of the reactive ink and BK ink in image data L from the standard value storing area 26 and compares the standard values with the scan data of each raster. If they are equal to each other, the value of the density correction table relative to the image data L will be determined to be L. If they are not equal to each other, the density correction table of each raster will be prepared by the density correction table preparing unit 24.

Figure 13:
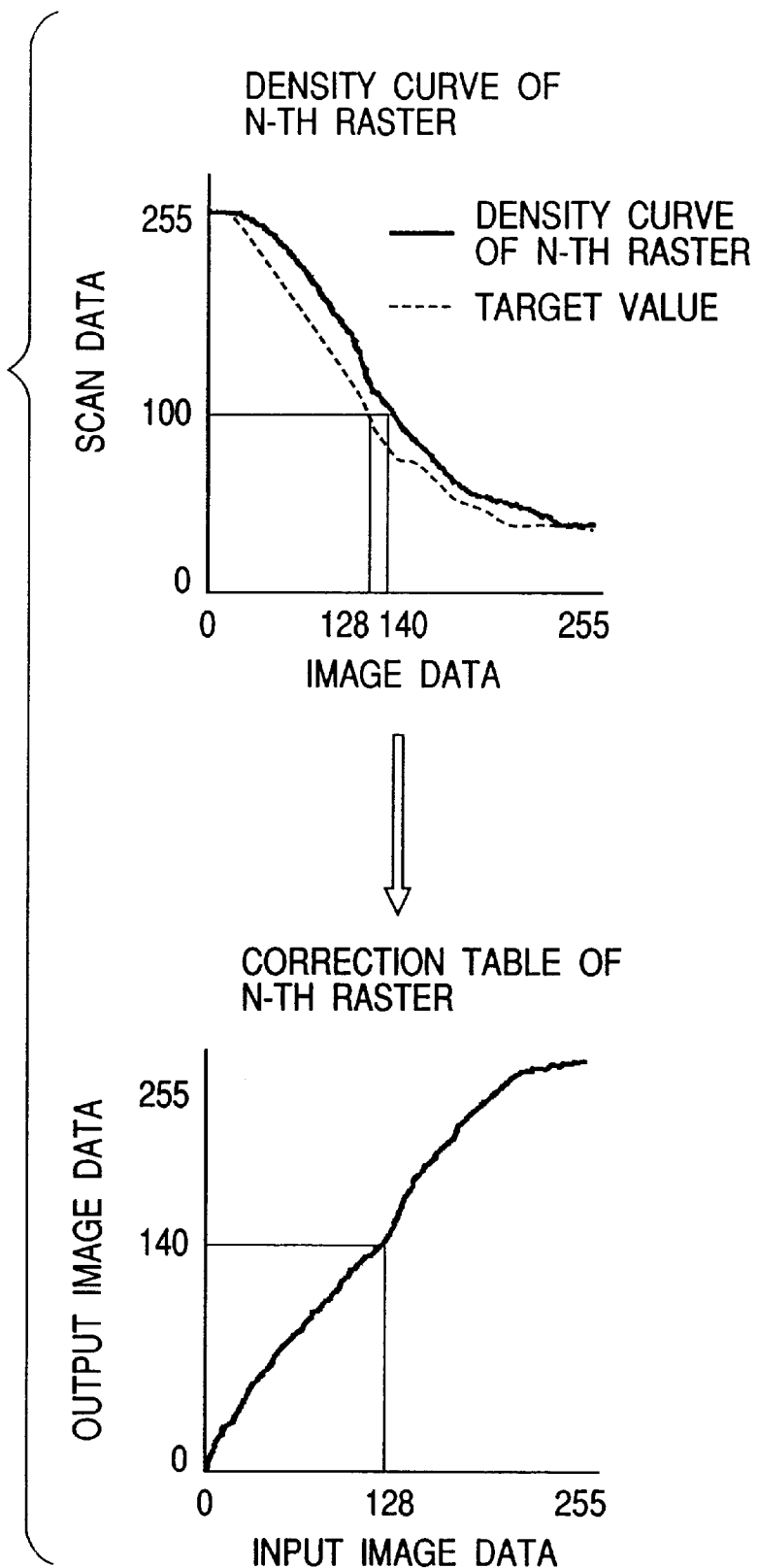
FIG. 13 is an explanatory view showing a method for preparing the density correction table showing a second embodiment of the present invention.

Now, referring to FIG. 13, a procedure for preparing the correction table of an n-th raster by the density correction table preparing unit 24 will be described below. Although a standard value at the time of the input image data 128 of the n-th raster is scan data 100, in fact, it is larger (thinner) than the scan data 100, and therefore, when the input image data is 128, output image data needs to be larger than 128. Since the n-th raster realizes the scan data 100 when it is printed at the time of image data 140, it is desired to form a table in which the output image data is 140 while the input image data is 128.

As described above, standard values are determined for all the image data from 0 to 255 for each kind of ink and each color of ink. Therefore, these standard values are employed when the tables for correcting the unevenness of density are prepared, hence any image data can assuredly eliminate the density difference due to the replacement of a head and the density difference between a plurality of printers and can ensure stable density. Consequently, the same image data can be outputted with the same density at any time.

Third Embodiment

Figure 14:
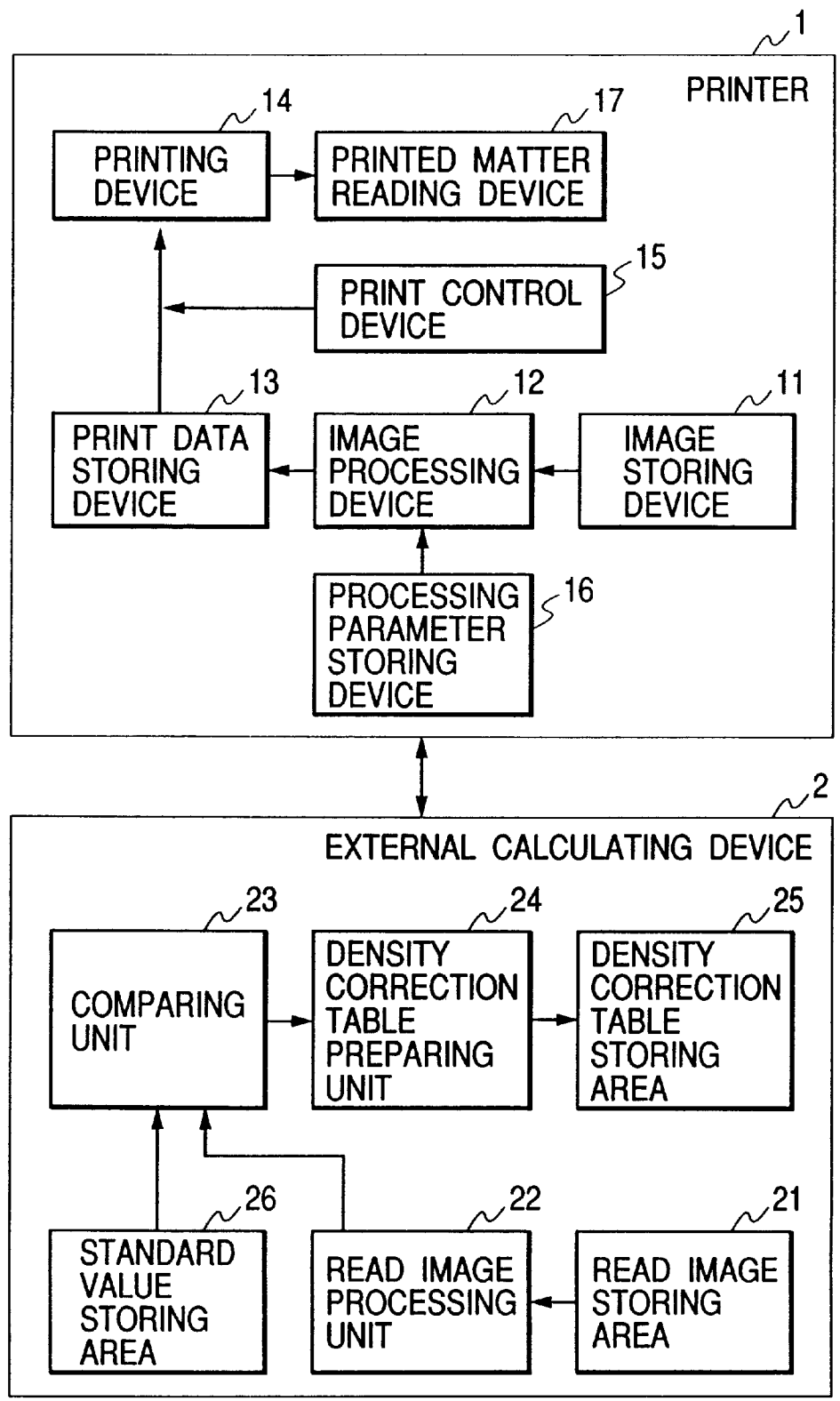
FIG. 14 is a system configuration diagram showing a third embodiment of the present invention.

As shown in FIG. 14, with the configuration of an apparatus having a printer in which a printed matter reading device is included, print patterns for measuring the densities of respective colors of ink which are printed as in the first embodiment are read by the printed matter reading device 17 included in the printer 1. The read image data is transferred to an external calculating device 2. Thus, the same procedure as that of the first embodiment is carried out so that the same effects as those of the first embodiment can be realized.

Fourth Embodiment

In the above described embodiments, the printed matter reading device 3 may possibly have an individual difference in the read data. A system according to the fourth embodiment is characterized in that a below mentioned configuration is added to each of the above embodiments in order to absorb this individual difference.

Figure 15:
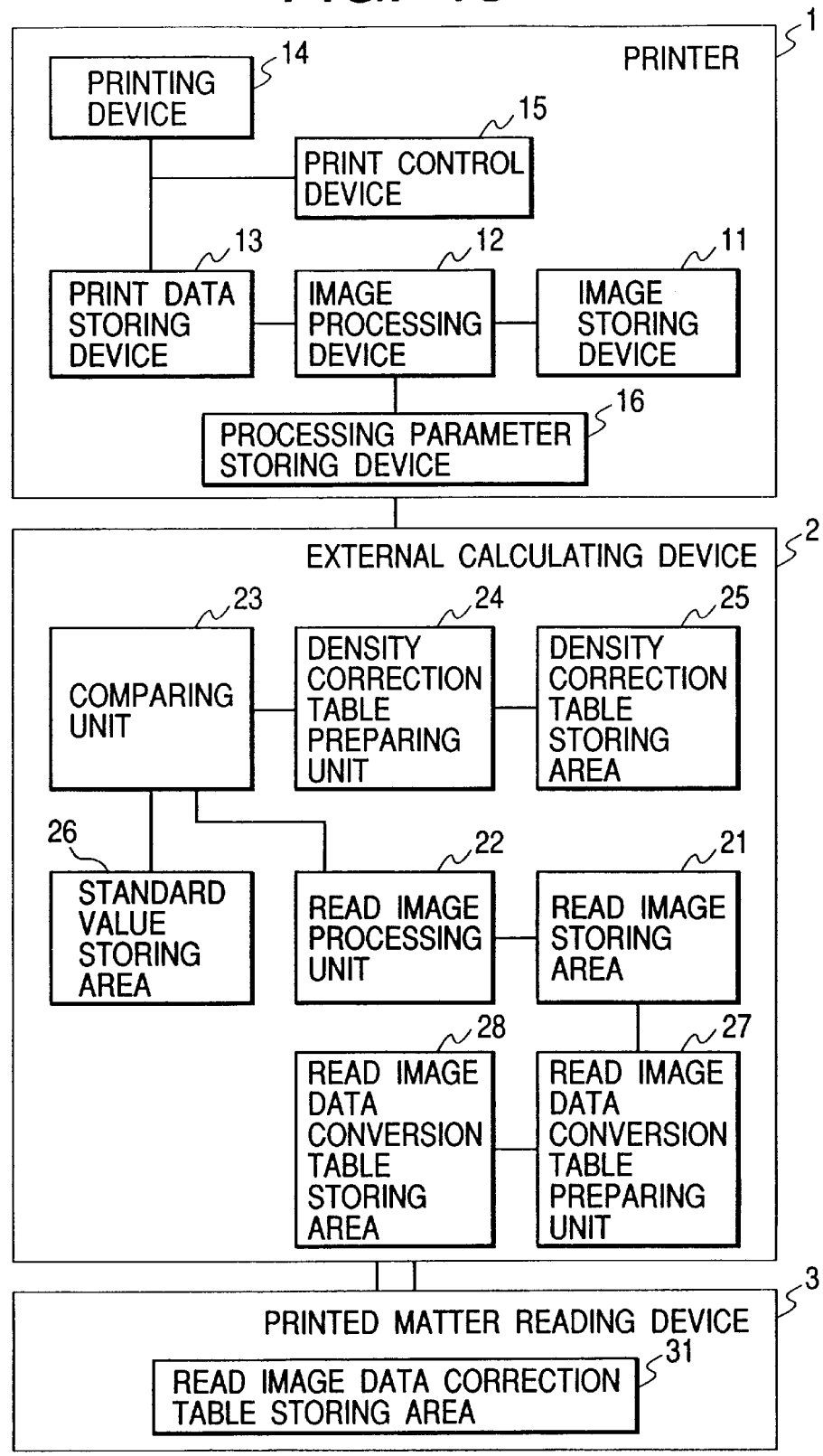
FIG. 15 is a system configuration diagram showing a fourth embodiment of the present invention.

The system of the fourth embodiment according to the present invention has a configuration as illustrated in FIG. 15 in which an external calculating device 2 having a read image data conversion table preparing unit 27 and a read image data conversion table storing area 28 and a printed matter reading device 3 having a read image data conversion table storing area 31 are added to the above embodiments. Then, below mentioned processes are performed so as to absorb the individual difference of the printed matter reading device and errors at the time of scanning.

When print patterns for preparing density correction tables are scanned, the tables stored in the read image data conversion table storing area 28 are sent to the printed matter reading device 3 and stored in the read image data conversion table storing area 31, so that the read image data in which the individual difference of the printed matter reading device 3 is corrected can be acquired.

Figure 17A:
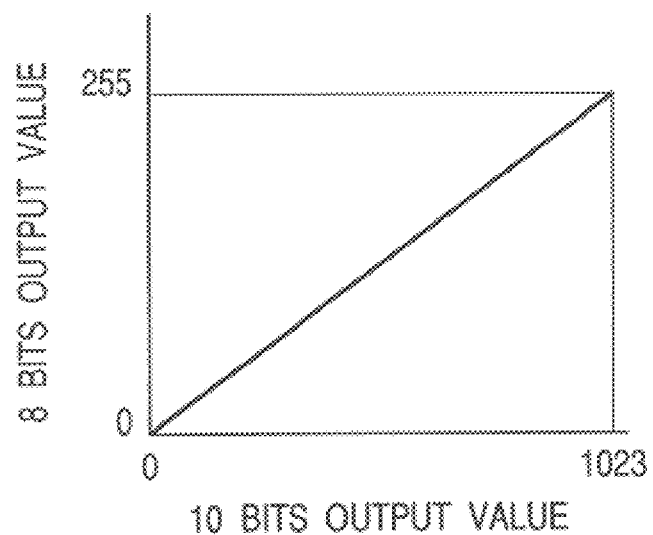
FIGS. 17A and 17B are explanatory views showing read image data conversion tables.

A read image data conversion table is previously formed by the read image data conversion table preparing unit 27. Initially, a gradation pattern serving as a reference is read by the printed matter reading device 3. The gradation pattern is a pattern configurated by a plurality of gradations. The densities of the respective gradations are apparently realized. In the case when the printed matter reading device 3 reads a printed matter on the basis of 10 bits per pixel and outputs the read printed matter by converting 10 bits into 8 bits per pixel, a conversion table as illustrated in FIG. 17B is formed from the read data when sending a linear conversion table from 10 bits to 8 bits as shown in FIG. 17A.

Figure 16:
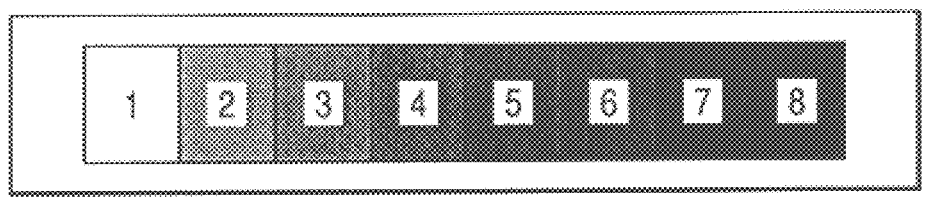
FIG. 16 shows an example of a reference gradation pattern for correcting a printed matter reading device.

For example, the reference gradation pattern is configured by eight gradations as shown in FIG. 16. When the reference gradation pattern is a pattern having various kinds of density as seen in FIG. 20, target output values are determined so that the output values of 8 bits become values got by normalizing the density (OD) of 0 to 1.8. The density (OD) 1.8 may be preferably deeper than the maximum density which is realized by the printer 1. When the output values using the linear conversion table as illustrated in FIG. 17A represent values shown in FIG. 20, the output values of 10 bits before conversion are also approximately determined. Therefore, at the time of the output values of 10 bits, the conversion table as illustrated in FIG. 17B is formed so as to convert them the 8 bit target values.

Figure 17B:
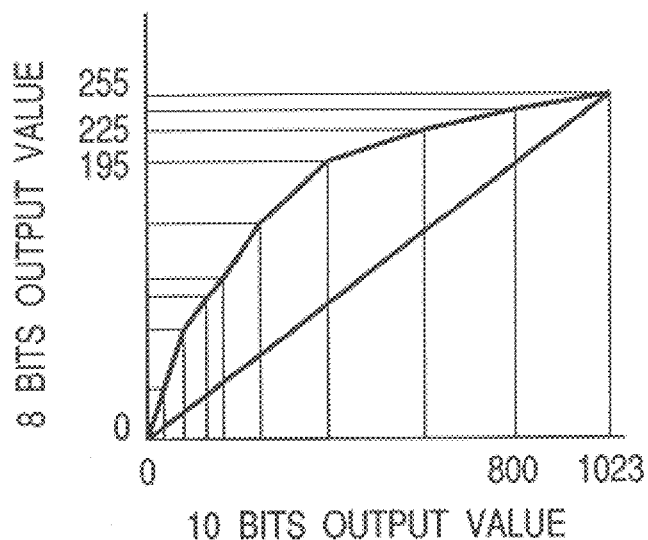

When print patterns for preparing density correction tables are scanned, the conversion table shown in FIG. 17B is transferred to the printed matter reading device so that the individual difference of the printed matter reading device 3 can be absorbed and the read data can be converted into values linear to the density.

As stated above, although the individual difference of the printed matter reading device 3 can be absorbed, there may be generated an error in the read data regardless of the use of the same printed matter reading device 3. Next, a method for correcting an error in scanning of the same printed matter reading device 3 will be described below.

When a print pattern for preparing a density correction table is scanned, a gradation pattern comprising of a plurality of gradations which configures a reference is scanned at the same time. The pattern configured by the plurality of gradations which constitutes the reference must be always the same read data, however, it sometimes deviates from a target value depending on its state. Then, the read data of the print pattern for preparing the density correction table is corrected in accordance with the degree of deviation from the target value, hence the error in each scanning of the printed matter reading device 3 can be absorbed.

Figure 19:
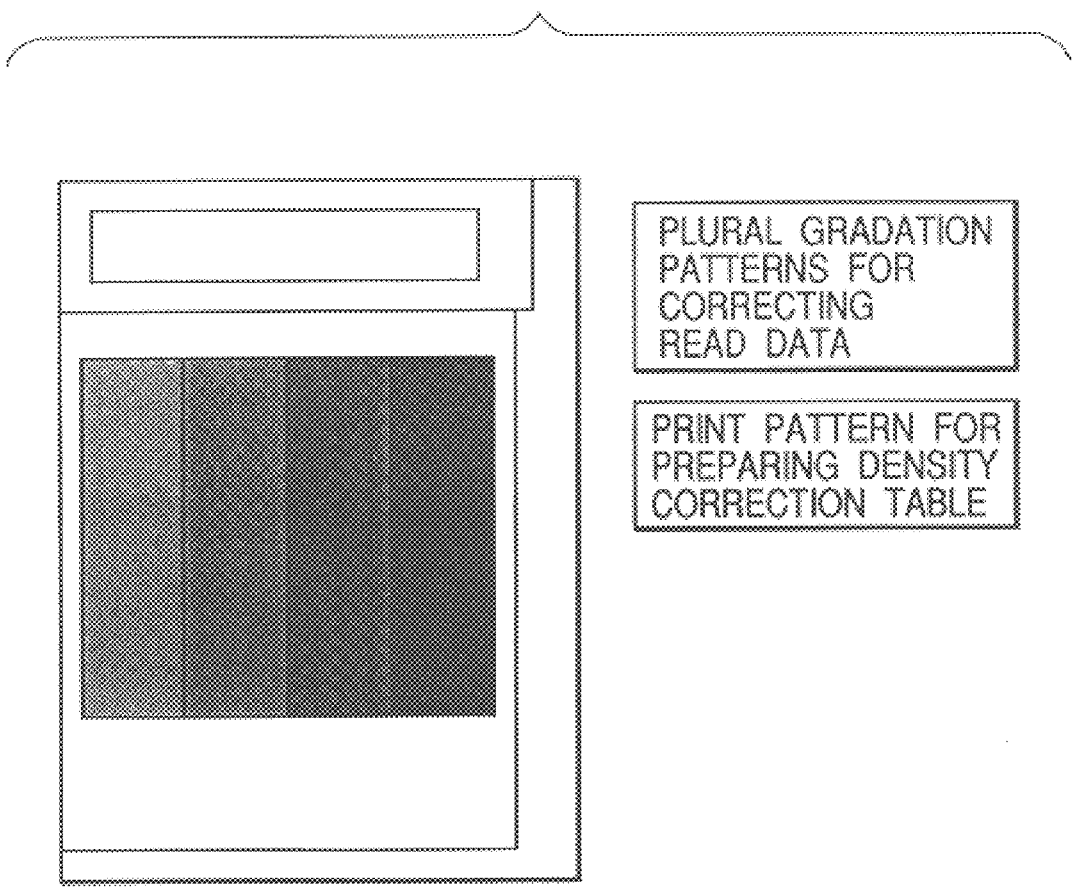
FIG. 19 is an explanatory view showing a read image.

Specifically, for instance, such a pattern as illustrated in FIG. 16 employed when the above read image data conversion table is created is determined as a reference gradation pattern configured by a plurality of gradations, and this gradation pattern and the print pattern for preparing the density correction table are simultaneously scanned by the printed matter reading device 3 as shown in FIG. 18. Thus, a scanned image as shown in FIG. 19 can be obtained. At this time, it is desired that the read data of the reference gradation pattern configured by a plurality of gradations in FIG. 16 always takes the same values as target values shown in FIG. 20, however, in fact, there is generated an error upon scanning. Thus, from this error, desired values are calculated for the scanned data of respective rasters of the print pattern for preparing the density correction table created by the read image processing unit 22.

For example, if actually read data are those as shown in FIG. 21 and the scan data of an n-th raster indicates 98.8, the scan data of the n-th raster is converted into 99.8 on the basis of the following expression, because 98.8 is located between the actual values 106 and 76 of gradations 5 and 6.

(105−75)/(106−76)*98.8+1=99.8

In such a manner, the individual difference of the printed matter reading device 3 and an error upon scanning operation can be absorbed, so that desired scan data can be acquired.

Fifth Embodiment

Figure 22:
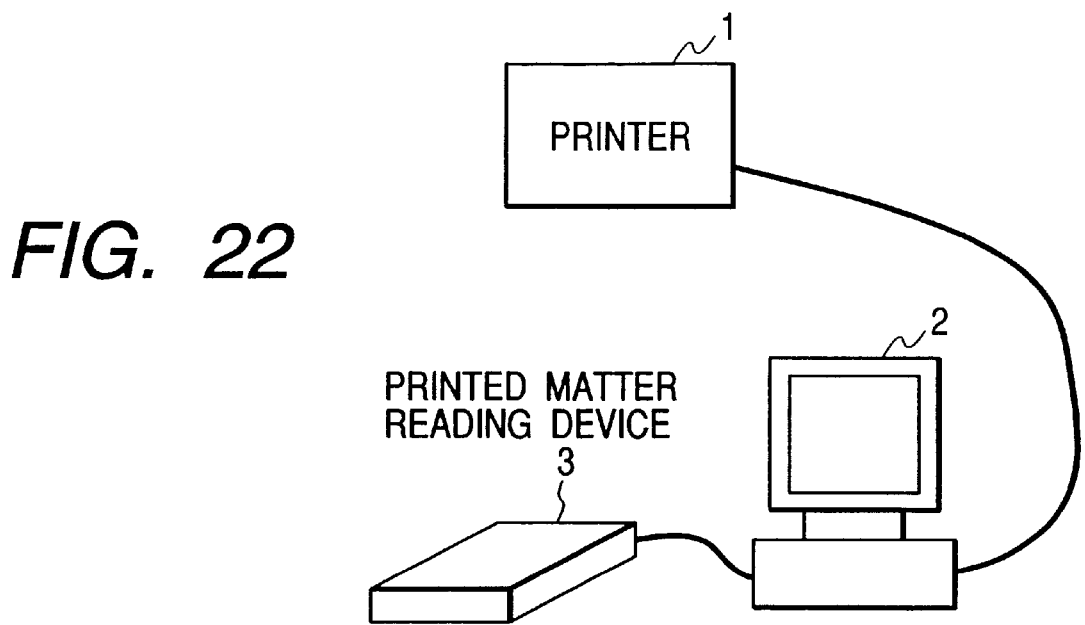
FIG. 22 is a system configuration diagram showing a fifth embodiment of the present invention.

FIG. 22 shows the configuration of a system according to a fifth embodiment of the present invention. The system comprises a printer 1, an external calculating device 2 for deciding the state of unevenness in density, preparing a density correction table and transferring the density correction table to the printer and a printed matter reading device 3 for reading print patterns printed by the printer 1.

A BJ type printer forms an image with dots. The size of respective dots is not equal. Further, one raster is configured by a dot or dots discharged from one nozzle or a plurality of nozzles. Therefore, when a dot discharged from a nozzle is smaller than those discharged from other nozzles, the raster formed by the nozzle constitutes an image thinner than those formed by other rasters. On the contrary, when the dot discharged from the nozzle is larger than those discharged from other nozzles, the raster formed by the nozzle constitutes an image deeper than those formed by other rasters. Consequently, for example, when a uniformly homogeneous image is printed, there is generated the unevenness of density in the main scanning direction of the head as illustrate d in FIG. 2.

For adjusting the diameter of dots so as to be uniform, the quantity of heat supplied to each nozzle may be adjusted. However, the quantity of heat supplied to the nozzles is limited, hence it is difficult to get the completely uniform dot diameter. Therefore, in order to correct the unevenness of density in the main scanning direction of the head as shown in FIG. 2, in case of the raster having a small dot, the dot is printed more than those of other rasters, so that the density can be effectively raised. Conversely, in case of the raster having a large dot, the dot is printed less than those of other rasters, so that the density can be effectively lowered. Since the printer 1 serves to binarize multi-value input image data transferred from the external calculating device and represent the binarized image data with dots so as to form an image, it converts the multi-value input image data into multi-value image data in accordance with a table for correcting the unevenness of density from multi-value to multi-value. Then, the converted multi-value image data is binarized so that the number of dots can be adjusted.

Four special colors of ink as well as four basic colors of ink including C (Cyan), M (Magenta), y (Yellow) and K (Black) are mounted on the printer 1 so that the total of eight colors of ink constitutes an image. In case of reactive ink, the special colors include, for example, light C, light M, Blue and Orange. Further, a printing operation is carried out by two heads arranged in front and rear parts in the cloth feeding direction for each color. The head located in the front part is called a Front head (F head) and the head located in the rear part is called a Rear head (R head), hereinafter.

Figure 3:
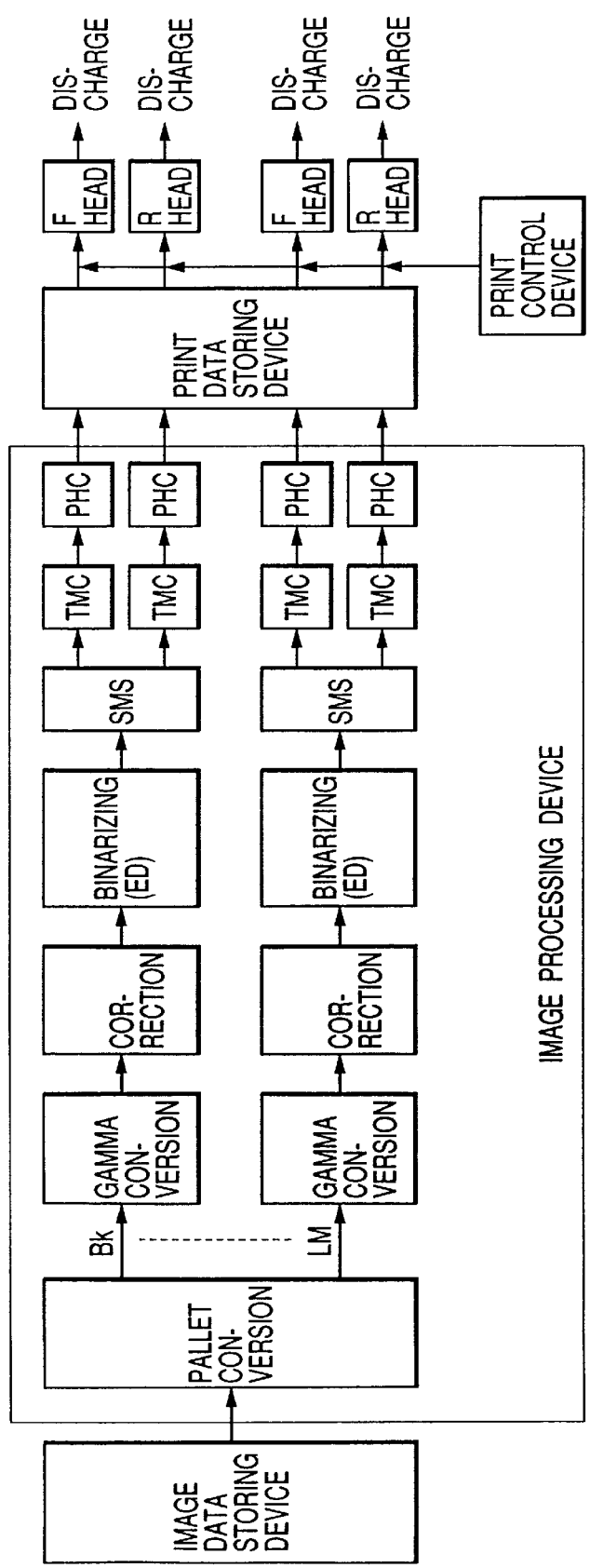
FIG. 3 is an explanatory view showing processes upon printing by a printing device.

Processes for binarizing the multi-value image data transferred to the printer 1 from the external calculating device 2, converting the binarized image data into head driving data and discharging ink from the nozzles to perform a printing are the same as those shown in FIG. 3, and therefore, the explanation of FIG. 3 will be omitted in this embodiment.

Now, a method for preparing a correction table will be described below.

In order to decide whether a watched raster is thinner or deeper than a reference, a pattern for correcting the density of each color is printed under the linear states of both correction tables and gamma tables. A print pattern is configured by a plurality of gradations as illustrated in FIG. 8. Further, the print pattern is configured by two bands or more of rasters for the purpose of preparing correction tables in a reciprocating printing. This is because of a fact that if the print pattern is exactly configured by the two bands of rasters, a boundary part will become whity due to the reflected light of white of a printing sheet upon reading the print pattern by a reading device.

This print pattern is read by the printed matter reading device. The provision of resolution equal to the print pattern permits one pixel of the print pattern to be coordinated with one pixel of a read image. In order to measure the uneven state of a gradation part read by full color of RGB and printed through some image data $L_m$, the average value of 256 pixels in the printing direction in that gradation part is determined as the scan data of the watched raster and it is decided whether each raster is larger or smaller than a reference (standard value). Hitherto, three data of R, G and B have been converted into gray scale data of 0 to 255 on the basis of the following Equation.

GRAY=a×log (R*0.6+G*0.3+B*0.1)+b a=log 255*255/(1−log255)

b=−255/(1−log255)　　　(Equation 1)

When gray data as shown in FIG. 9 is obtained, a range having values not lower than a certain threshold value is gotten. This range is employed as A and the data of two bands is determined from the center of this range. At the time of a one-way printing, a correction table for one band may be obtained. Since the data for two bands has been already obtained, more average scan data of one band can be obtained by averaging the data of two bands. Then, the average value of the scan data (gray scale data) of all rasters is gotten. Assuming that the average value is AVE and the scan data (gray scale data) of the n-th raster which is acquired by the Equation 1 is D(n), the correction amount $\Delta L_m(n)$ relative to the watched raster in the image data $L_m$ can be obtained by the following Equation.

$\Delta L_m(n)=c*(AVE−D(n))$ $0 \leq D(n) \leq 255$　　　(Equation 2)

c: kind of ink, positive constant specified by the color of ink

When the scan data of the n-th raster is larger than the average value, it is decided that this raster is deep so that the correction amount becomes negative. Thus, a correction is carried out to output values smaller than $L_m$ to the image data $L_m$. On the contrary, when the scan data of the n-th raster is smaller than the average value, it is decided that this raster is thin so that the correction amount becomes positive. Thus, a correction table is prepared to output values larger than $L_m$ to the image data $L_m$. The same procedure as that mentioned above is performed for a plurality of gradations so that the correction table of the n-th raster is formed as shown in FIG. 10.

Figure 23:
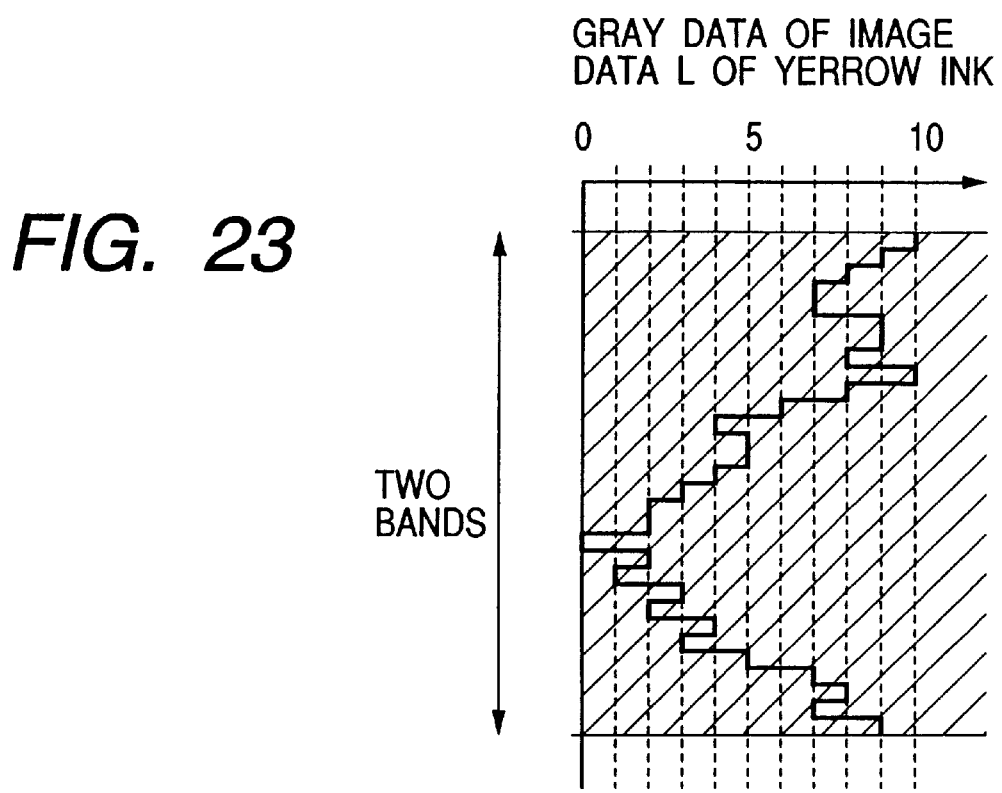
FIG. 23 shows an example of scanned data according to a prior art.

According to the above described method, however, for instance, Yellow ink or the like substantially react s only to a B filter of R, G and B filters. The Yellow ink scarcely reacts to the R and G filters, and therefore, R and G data takes values substantially near to 255. Accordingly, the gray scale data of the Yellow ink shifts within a range of 0 to 10 and its quantization is roughened. This state is illustrated in FIG. 23. The correction amount was gotten under this state. Assuming that the average value of all the rasters is 5, minimum gray scale data is 0, and maximum gray scale data is 10, the correction amount of respective rasters could include only 11 steps of 0, ±c, ±2*c, ±3*c, ±4*c and ±5*c, hence a fine correction could not be performed. In practice, human eyes were not sensitive to the unevenness of Yellow. However, in the BJ type printer, most of the colors are realized by process colors, and therefore, if there is generated unevenness in monochromatic Yellow which cannot be recognized by the human eyes, the unevenness will become striking in other colors realized by using the Yellow ink. Therefore, it is significant to correct the unevenness of density in the monochromatic Yellow.

For meeting this problem, according to this embodiment, the three data of R, G and B are not converted into gray scale data, but a correction table is created by using the most sensitive data of three, so that the correction amount can be divided more finely into steps to form a proper correction table.

Initially, the above described data is compared with the average scan data in the area of the gradation part of a read image and data with the smallest value among R, G and B is adopted. In the case of the Yellow ink, B data takes the smallest value. Assuming that the scan data D(n) of the n-th raster is equal to B by directly employing the B data as it is, when the value of B is large, the color of the data is thin, and when the value of B is small, it is deep, because the B data is luminance data. Accordingly, the Equation 2 is changed to a Equation 3.

$$\Delta L_m(n) = d*(AVE - D(n))$$

$$0 \leq D(n) \leq 255 \quad \text{(Equation 3)}$$

Here, d indicates the kind of ink and a negative constant determined by the color of ink.

Figure 24:
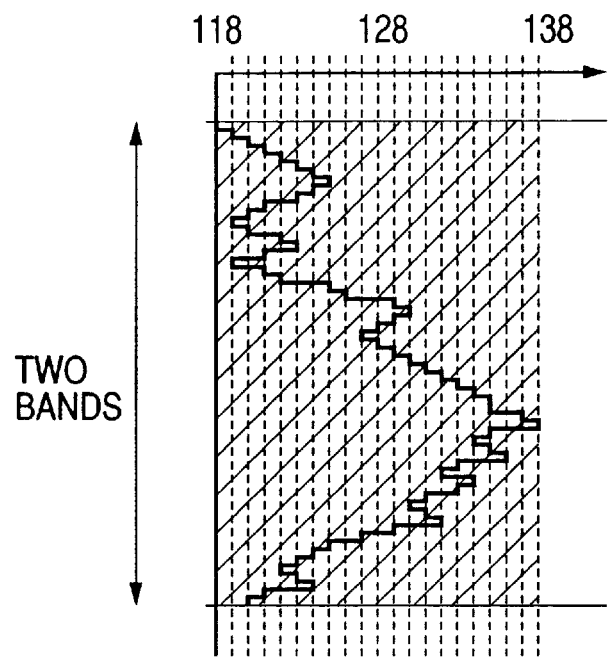
FIG. 24 shows an example of the scanned data of the fifth embodiment of the present invention.

For example, when the data of R, G and B is converted into gray scale data to obtain the result as shown in FIG. 23, the B data becomes scan data as shown in FIG. 24. If the correction amount is obtained by employing the B data, the correction amount of respective rasters may take finer 21 steps including 0, ±d, ±2*d, . . . ±10*d, because an average value is 128, minimum scan data is 118 and maximum scan data is 138. Thus, even in case of Yellow ink, an appropriate correction table can be formed without rough quantization.

According to the above described method, proper correction tables can be formed for special colors other than the four basic colors of C, M, Y, K.

As mentioned above, only one data with the best sensitivity is selected among the full color data of R, G and B of the read image so that a proper correction table can be prepared for any kind of ink.

Sixth Embodiment

In a sixth embodiment of the present invention, the full color data of R, G and B is not converted into the gray scale data, but into the data of the sum of R+G+B and they are synthesized together without roughening the quantization of each data so that a proper correction table can be formed.

Initially, the scan data of each raster is obtained on the basis of the Equation 1 to Equation 4 of the fifth embodiment.

Assuming that the scan data of the n-th raster is D(n), when the value of D(n) is large, the color of the data is thin, and when the value of B is small, it is deep, because D(n) indicates the sum of luminance data. Accordingly, the Equation 2 is changed to the following Equation 5.

$$DATA = R+G+B \quad \text{(Equation 4)}$$

$$\Delta L_m(n) = e*(AVE - D(n))$$

$$0 \leq D(n) \leq 765 \quad \text{(Equation 5)}$$

Here, e indicates the kind of ink and a negative constant determined by the color of ink.

Figure 25:
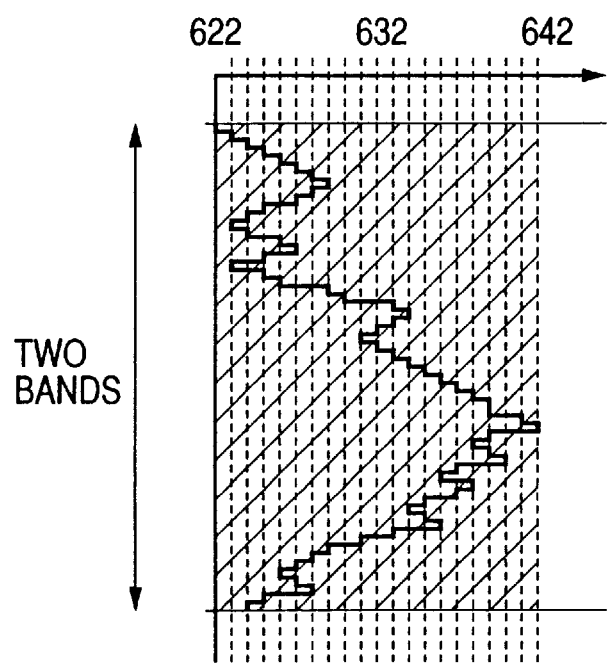
FIG. 25 shows an example of the scanned data of the sixth embodiment of the present invention.

For example, when the data of R, G and B is converted into gray scale data to obtain the result as shown in FIG. 23, the R+G+B data becomes scan data as shown in FIG. 25. If the correction amount is obtained by employing the B data, the correction amount of respective rasters may take finer 21 steps including 0, ±d, ±2*d, . . . ±10*d, because an average value is 632, minimum scan data is 622 and maximum scan data is 642. Thus, even in the case of Yellow ink, an appropriate correction table can be formed without rough quantization.

According to the above described method, proper correction tables can be formed for special colors other than the four basic colors of C, M, Y, K.

As mentioned above, the sum of the luminance data of R+G+B is obtained from the full color data of R, G and B of the read image so that the correction amount can be more finely divided and a correction table for correcting the more delicate unevenness of density can be formed for any kind of ink.

According to the above embodiment 5 or 6, when the correction table is calculated, only one of the most sensitive data of the full color data of R, G and B which is obtained by reading the print pattern for each ink by the printed matter reading device is used, or the data of R+G+B is used, hence finer quantization of the data can be realized and a proper correction can be made.

Other Embodiments

It should be noted that the present invention may be applied to a system comprising a plurality of devices such as a host computer, an interface device, a reader, a printer, etc. or to a system comprising one device such as a copying machine and facsimile equipment.

Further, for achieving the functions of the above described embodiments, an apparatus embodied by supplying the program code of software for realizing the functions of the above embodiments to a computer in an apparatus or a system connected to various kinds of devices so as to operate them, and operating the various kinds of devices in accordance with a program stored in the computer (CPU or MPU) of the system or the apparatus may be included within the scope of the present invention.

Further, in this case, the program code itself of the software realizes the functions of the above embodiments, and therefore, the program code itself and a unit for supplying the program code to the computer such as a storing medium in which the program code is stored constitutes the present invention.

As the recording medium for storing the program code, for instance, a floppy disk, a hard disk, an optical disk, an optical magnetic disk, a CD-ROM, a magnetic tape, a non-volatile memory card, a ROM or the like can be employed.

Needless to say, the above described program code may be included in an embodiment of the present invention not only when the functions of the above described embodiments are realized by executing the program code supplied to the computer, but also when the functions of the above embodiments are realized by driving the program code in cooperation with OS (operating system) operating in the computer or other application software, etc.

Further, it should be noted that a case in which after the supplied program code is stored in a memory provided in the capability expansion board of the computer or a capability expansion unit connected to the computer, the CPU or the like provided in the capability expansion board or the capability expansion unit performs a part or all of actual processes based on the instruction of the program code so that the functions of the above embodiments are realized may be involved in the present invention.

It should be also noted that other variations and modifications may be made without departing the spirit and scope of the present invention.

What is claimed is:

1. An image processing apparatus comprising:

image forming means for forming an image by discharging liquid ink from a plurality of recording elements;

processing means for processing image data in accordance with a correction table corresponding to each of the plurality of recording elements;

comparing means for comparing standard values previously set with read data obtained by reading a pattern having a plurality of gradations recorded by said image forming means; and generating means for generating the correction table for each of the recording elements based on a comparison result obtained by said comparing means.

2. An image processing apparatus according to claim 1, wherein said image forming means has heads having the plurality of recording elements, which respectively correspond to a plurality of recording agents, and wherein said heads can be replaced.

3. An image processing apparatus according to claim 1, further comprising setting means for setting the standard values.

4. An image processing apparatus according to claim 1, wherein said image forming means has heads having the plurality of recording agents, and wherein the correction table includes data for a number of rasters that is N times (N is an integer) as many rasters as the heads scan to form images in a one-way scan.

5. An image processing apparatus according to claim 1, wherein the standard values previously set have been previously set depending on kinds of recording agents and the kinds of recording agents are specified by the kinds of ink and the colors of ink.

6. An image processing apparatus according to claim 1, further comprising:

image reading means for reading an image; and creating means for comparing read data obtained by reading a reference pattern using the image reading means with reference data corresponding to the reference pattern, and creating correction data for the image reading means, wherein the pattern recorded by said image forming means is read by said image reading means, and wherein the read data is data corrected using the correction data.

7. An image processing apparatus according to claim 6, wherein the reference pattern and the formed image are simultaneously read by said image reading means.

8. An image processing method comprising the steps of:

forming an image by discharging liquid ink from a plurality of recording elements;

processing image data in accordance with a correction table corresponding to each of the plurality of recording elements;

comparing standard values previously set with read data obtained by reading a pattern having a plurality of gradations recorded in said image forming step; and generating a correction table for each of the recording elements based on a comparison result obtained in said comparing step.

* * * * *

UNITED STATES PATENT AND TRADEMARK OFFICE
CERTIFICATE OF CORRECTION

| | | |
|---|---|---|
| PATENT NO. | : 6,354,688 B1 | |
| DATED | : March 12, 2002 | |
| INVENTOR(S) | : Shizuko Inoue et al. | |

It is certified that error appears in the above-identified patent and that said Letters Patent is hereby corrected as shown below:

Drawings,
Sheet 2, FIG. 4, "LASTER" both occurrences should read -- RASTER --.
Sheet 16, FIG. 23, "YERROW" should read -- YELLOW -- and insert -- prior art --.
Sheet 17, FIGS. 24 and 25, "YERROW" should read -- YELLOW --.

Column 1,
Lines 46 and 64, "above mentioned" should read -- above-mentioned --; and
Line 66, "dot" should read -- dots --.

Column 2,
Lines 9, 19, 36 and 59, "above described" should read -- above-described --.

Column 4,
Line 57, "on" (second occurrence) should read -- of --; and
Line 66, "inkject" should read -- ink-jet --.

Column 6,
Line 3, "cycles" should read -- cycle --; and
Line 31, "whity" should read -- white --.

Column 7,
Lines 19 and 26, "gotten," should read -- obtained, --;
Line 31, "configures" should read -- configure --;
Line 38, "a" should read -- an --;
Line 40, "a" (first occurrence) should read -- the --;
Line 43, "$0 \leq D(n) \leq 255$" should read -- $\P 0 \leq D(n) \leq 255$ --;
Line 54, "above mentioned" should read -- above-mentioned --; and
Line 66, "AS" should read -- As --.

Column 8,
Line 43, "pattern." (close up right margin);
Line 44, "¶The" (close up left margin);
Line 54, "gotten," should read -- obtained, --; and
Line 61, "got," should read -- obtained, --.

Column 9,
Line 49, "above described" should read -- above-described --;
Lines 52 and 62, "below mentioned" should read -- below-mentioned --.

UNITED STATES PATENT AND TRADEMARK OFFICE
CERTIFICATE OF CORRECTION

PATENT NO. : 6,354,688 B1
DATED : March 12, 2002
INVENTOR(S) : Shizuko Inoue et al.

It is certified that error appears in the above-identified patent and that said Letters Patent is hereby corrected as shown below:

Column 10,
Line 22, "got" should read -- obtained --;
Line 31, "the" should read -- to --; and
Line 66, "takes" should read -- take --.

Column 11,
Line 37, "illustrate d" should read -- illustrated --; and
Line 59, "y" should read -- Y --.

Column 12,
Line 18, "whity" should read -- white --;
Lines 41 and 48, "gotten." should read -- obtained. --.

Column 13,
Lines 4, 31 and 55, "above described" should read -- above-described --;
Line 5, "react s" should read -- reacts --;
Line 11, "gotten" should read -- obtained --; and
Line 40, "a" should read -- an --.

Column 14,
Line 29, "above described" should read -- above-described --; and
Line 52, "above" should read -- above- --.

Column 15,
Lines 6 and 8, "above described" should read -- above-described --.

Signed and Sealed this

Twenty-eighth Day of January, 2003

JAMES E. ROGAN
*Director of the United States Patent and Trademark Office*